(12) United States Patent
Sakayori et al.

(10) Patent No.: US 7,773,810 B2
(45) Date of Patent: Aug. 10, 2010

(54) IMAGE PROCESSING APPARATUS AND COMPUTER PROGRAM PRODUCT

(75) Inventors: Tetsuya Sakayori, Ohta-ku (JP); Junichi Takami, Ohta-ku (JP); Bin Lu, Ohta-ku (JP); Yu Sekiguchi, Ohta-ku (JP); Yoshinaga Kato, Ohta-ku (JP); Yoshifumi Sakuramata, Ohta-ku (JP); Iwao Saeki, Ohta-ku (JP); Toshio Miyazawa, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 895 days.

(21) Appl. No.: 11/519,916

(22) Filed: Sep. 13, 2006

(65) Prior Publication Data

US 2007/0091394 A1   Apr. 26, 2007

(30) Foreign Application Priority Data

Sep. 14, 2005   (JP) .............................. 2005-267056
Jul. 18, 2006   (JP) .............................. 2006-196204

(51) Int. Cl.
   *G06K 9/62*   (2006.01)
   *G06K 9/46*   (2006.01)
(52) U.S. Cl. ...................................... 382/209; 382/190
(58) Field of Classification Search ................ 382/181, 382/190, 209, 218, 276, 254, 309, 305
   See application file for complete search history.

(56) References Cited

U.S. PATENT DOCUMENTS 5,982,953 A * 11/1999 Yanagita et al. ............. 382/294
6,023,527 A    2/2000  Narahara
6,701,011 B1   3/2004  Nakajima
6,956,966 B2 * 10/2005 Steinberg ..................... 382/167
2003/0002746 A1 * 1/2003 Kusaka ........................ 382/255
2003/0218642 A1  11/2003 Sakayori et al.
2005/0246604 A1  11/2005 Fujimoto et al.

FOREIGN PATENT DOCUMENTS

| JP | 9-149271 | 6/1997 |
| JP | 11-88906 | 3/1999 |
| JP | 11-234503 | 8/1999 |
| JP | 2002-103726 | 4/2002 |
| JP | 2003-5471 | 1/2003 |
| JP | 3600372 | 9/2004 |
| JP | 2005-122601 | 5/2005 |

OTHER PUBLICATIONS

Computer english translation of Japanese patent No. 2005-122601 "Masashi", pp. 1-32.*

* cited by examiner

*Primary Examiner*—Daniel G Mariam
(74) *Attorney, Agent, or Firm*—Oblon, Spivak, McClelland, Maier & Neustadt, L.L.P.

(57) ABSTRACT

An image processing unit executes an image process on a target image based on process-setting contents, and generates a processed image. An area extracting unit compares the processed image with the target image, and extracts a partial area of a predetermined size showing a notable effect of the image process executed on the target image, as a checking area. A checking-image display unit displays the processed image corresponding to the extracted checking area on a display unit, as a checking image for checking the process-setting contents of the image process.

5 Claims, 11 Drawing Sheets

| IMAGE-QUALITY ADJUSTING ITEM | CALCULATION PARAMETER | SET VALUE | CALCULATION AMOUNT | |
| --- | --- | --- | --- | --- |
| | | | CHECK | OUTPUT |
| SHARPNESS | HIGH-FREQUENCY ELEMENT | CLEAR | +30% | +20% |
| | | SMOOTH | −30% | −20% |
| COLOR ADJUSTMENT (YELLOW) | YELLOW ELEMENT | STRONG | +20% | +10% |
| | | WEAK | −20% | −10% |
| ... | ... | ... | | |

| IMAGE-QUALITY ADJUSTING ITEM | EXTRACTION REFERENCE 1 | EXTRACTION REFERENCE 2 |
|---|---|---|
| SHARPNESS | HIGH-FREQUENCY ELEMENT | LOW-FREQUENCY ELEMENT |
| COLOR ADJUSTMENT (YELLOW) | YELLOW | |
| ... | ... | ... |

IMAGE PROCESSING APPARATUS AND COMPUTER PROGRAM PRODUCT

CROSS-REFERENCE TO RELATED APPLICATIONS

The present document incorporates by reference the entire contents of Japanese priority documents, 2005-267056 filed in Japan on Sep. 14, 2005 and 2006-196204 filed in Japan on Jul. 18, 2006.

BACKGROUND OF THE INVENTION

1. Field of the Invention

The present invention relates to an image processing apparatus and a computer product.

2. Description of the Related Art

In using an image processing apparatus, such as a copier, fax machine, printer, and a multifunction product (MFP) having combined functions of copying, faxing, printing, a user has to selects a function to execute from functions the image processing apparatus offers, and to make setting for desired functional contents. For example, the user needs to make setting on the condition of a document, such as the type and the density of the document, on various image processes, such as zoom, single-side/double-side printing, and margin size adjustment, and on postprocessing, such as sorting, stapling, and punching.

A conventional image processing apparatus provides enormous numbers of setting items and a plurality of setting contents for each item to allow a user to execute a variety of setting. The user, who wants to obtain a desired result, is required to select a type of setting out of those enormous setting items and contents.

The user, however, has no way to know what kind of a process result to receive according to setting contents in using the conventional image processing apparatus. For example, the user has to wait for actual print-out from the image processing apparatus to know a print result for the user. The obtained print result often ends up in a kind of finished product that the user does not expect to get.

To solve the above problem, some apparatuses and systems have been proposed, which include a preview display apparatus (see, for example, Japanese Patent Application Laid-Open No. 2003-5471) that displays a preview image showing the state of a printed result, an image processing apparatus (see, for example, Japanese Patent Application Laid-Open No. 2002-103726) that displays a preview image showing image data printed on a paper corresponding to selected paper image data when the paper image data to express a paper style of a different paper quality is selected, and an image forming system (see, for example, Japanese Patent Application Laid-Open No. 1999-234503) that displays a preview image of data made by synthesizing a plurality of edited and processed image data.

The conventional techniques offer a function of only displaying a preview of a single image, or an image synthesized from a plurality of images, that shows the result of image processes executed according to setting contents.

A user checks such preview images to make setting again for correction, which allows the user to perform setting operation while checking an image for a finished condition before proceeding to a print-out process, and finally obtain desired image output.

The applicant of the present invention has proposed a color reproduction area corrective method. This method is carried out by assessing the image quality of an output color image on the basis of characteristic quantities extracted from an input color image and the output color image, determining a color reproduction area corrective method offering a highest assessment value among a plurality of color reproduction area corrective methods, and correcting the input color image into an output color image using the determined color reproduction area corrective method (see Japanese Patent Application Laid-Open No. 1997-74494).

Such a conventional technique as disclosed in the Japanese Patent Application Laid-Open No. 2002-103726, however, offers an advantage of merely displaying a preview of an image resulting from an image process executed according to setting contents in the form of one image or a plurality of images synthesized into an image, or merely displaying a preview of an image resulting from a series of processes including an image process, a printing process, and a post-process. The conventional technique, therefore, does not allow a user to check a process result sufficiently for specific items to focus on, for example, for such image quality adjustment items as sharpness adjustment of adjusting the sharpness of character outlines or smoothness of photographs, and color adjustment of correcting hues. This requires the improvement of the conventional technique in carrying out easy and proper setting for an image process enabling such image quality adjustment.

According to the conventional technique disclosed in the Japanese Patent Application Laid-Open No. 1997-74494, characteristic quantities are extracted from an input color image and an output color image to carry out proper color reproduction area correction. An output color image resulting from color reproduction area correction, however, is just displayed to merely offer a final outcome, which makes it impossible for a user to check characteristic parts of the output color image highly precisely to assess the final outcome. This also requires the improvement of the conventional technique in carrying out easy and proper setting for an image process enabling such check on the characteristic parts.

SUMMARY OF THE INVENTION

It is an object of the present invention to at least partially solve the problems in the conventional technology.

An image processing apparatus according to one aspect of the present invention includes an image processing unit that executes an image process on a target image based on process-setting contents, and generates a processed image; an area extracting unit that compares the processed image with the target image, and extracts a partial area of a predetermined size showing a notable effect of the image process executed on the target image, as a checking area; and a checking-image display unit that displays the processed image corresponding to the extracted checking area on a display unit, as a checking image for checking the process-setting contents of the image process.

A computer program product according to another aspect of the present invention includes a computer usable medium having computer readable program codes embodied in the medium that when executed causes a computer to execute generating a processed image by executing an image process on a target image based on process-setting contents; extracting a partial area of a predetermined size showing a notable effect of the image process executed on the target image, as a checking area, by comparing the processed-image with the target image; and displaying the processed image corresponding to the extracted checking area on a display unit, as a checking image for checking the process-setting contents of the image process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. Since the embodiments to be described below are provided as the preferred embodiments according to the present invention, various limitations preferable in terms of technical purposes are added to the embodiments. The scope of the present invention, however, is not limited to the description of the embodiments to follow unless the following description presents any particular statement that limits the scope of the invention.

A first embodiment of the present invention represents a case where an MFP is used as an image processing apparatus. The MFP has combined functions of copying, faxing, printing, scanning, and of distributing an input image (read document image predetermined by a scanner function, input image predetermined by a printer or fax function, etc.).

Figures 1, 2:
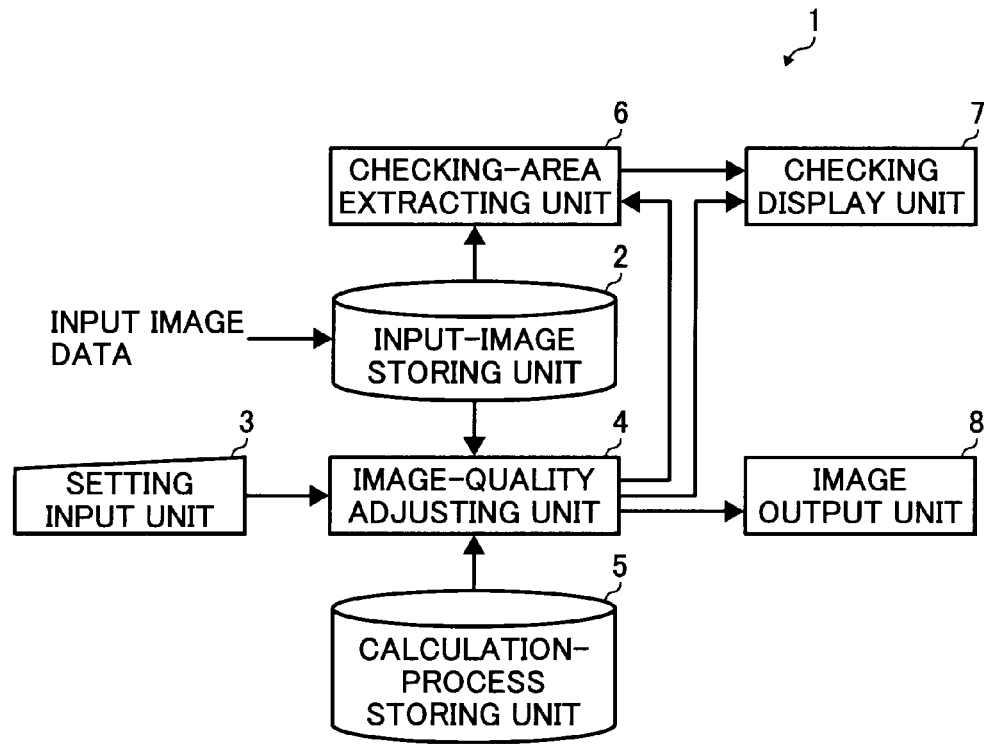
FIG. 1 is a block diagram of the main units of an image processing apparatus according to a first embodiment of the present invention.
FIG. 2 is a model view of one example of a calculation process table.

Each of FIGS. 1 to 6 is a graphic diagram of the first embodiment of the image processing apparatus according to the present invention. FIG. 1 is a block diagram of the main components of an image processing apparatus 1 to which the first embodiment of the image processing apparatus according to the present invention is applied.

As shown in FIG. 1, the image processing apparatus 1 includes an input-image storing unit 2, a setting input unit 3, an image-quality adjusting unit 4, a calculation-process storing unit 5, a checking-area extracting unit 6, a checking display unit 7, and an image output unit 8. The image processing apparatus 1 further includes an image input unit not shown. The image processing apparatus 1 is applicable to a fax machine, copier, printer, compound device, a computer, etc.

The image processing apparatus 1 executes a process at two stages consisting of a check process stage, at which a result of an image process on an input image data (target image data) is displayed at the checking display unit 7 and resetting for image quality adjustment is made at the setting input unit 3, and an output process stage, at which an image is finally printed out on a paper, etc. at the image output unit 8 on the basis of the image data having been subjected to an image process according to the completed setting for image quality adjustment.

The input-image storing unit 2 is made up of a hard disk, RAM (Random Access Memory), etc. The input-image storing unit 2 temporarily stores such input image data (target image data) from the image input unit of a scanner unit, communication unit, etc., as manuscript image data read by the scanner unit or image data obtained from a communication line via the communication unit.

The setting input unit 3 includes, for example, a touch panel, which is disposed on the checking display unit 7 (display unit) made of a crystal display, etc., and various operating keys. The setting input unit 3 serves as a user interface of the image processing apparatus 1. The setting input unit 3 detects an image quality adjustment item selected by a user, and delivers the selected item to the image-quality adjusting unit 4. After display of a checking area on the checking display unit 7, which will be described later, is over, the setting input unit 3 receives a set value selected from a plurality of set values prepared for each selected image adjustment item, and delivers the selected set value to the image-quality adjusting unit 4.

The calculation-process storing unit 5 stores image quality adjustment items (process items), which are specified by user's operation on the setting input unit 3, calculation parameters corresponding to image quality adjustment items, a plurality of set values (process set value) prepared for each image quality adjustment item, and calculation quantities corresponding to the set values. The calculation quantities consist of a check calculation amount for an image quality adjusting set value for displaying image data on the checking display unit 7, and an output calculation amount for an image-quality adjusting set value for outputting an image from the image output unit 8. The image-quality adjusting unit 4 uses the check and output calculation quantities stored in the calculation-process storing unit 5 to carry out image quality adjustment on checking image data and on output image data. This process corrects a difference in image appearance between display on the checking display unit 7 and output on the image output unit 8.

The calculation-process storing unit 5, for example, stores a calculation parameter, set values, and check/output calculation quantities for each image quality adjustment item as the contents of a calculation process table, as shown in FIG. 2.

In the table, for example, "high-frequency element" is recorded as a calculation parameter for an image quality adjustment item of "sharpness", and "clear" and "smooth" are recorded as set values for the calculation parameter "high-frequency element". A check calculation amount of +30% is recorded for the set value "clear", and the same of −30% is recorded for the set value "smooth". An output calculation amount of +20% is recorded for the set value "clear", and the same of −20% is recorded for the set value "smooth".

Meanwhile, "yellow element" is recorded as a calculation parameter for an image quality adjustment item of "color adjustment (yellow)", and "strong" and "weak" are recorded as set values for the calculation parameter "yellow element". A check calculation amount of +20% is recorded for the set value "strong", and the same of −20% is recorded for the set value "weak". An output calculation amount of +10% is recorded for the set value "strong", and the same of −10% is recorded for the set value "weak".

The image-quality adjusting unit (image processing unit) 4 carries out image quality adjustment on an image of input image data in the input-image storing unit 2 according to setting made at the setting input unit 3. At the check process stage, as described later, the image-quality adjusting unit 4 obtains a calculation parameter from the calculation-process storing unit 5 on the basis of an image quality adjustment item receiving from the setting input unit 3, and searches the calculation-process storing unit 5 to obtain a check calculation amount on the basis of a set value for the calculation parameter that is selected at the setting input unit 3. The image-quality adjusting unit 4 then executes a calculation process on the input image data, using the obtained check calculation amount, to make a checking image, and puts out the checking image to the checking-area extracting unit 6, and to the checking display unit 7.

At the output process stage, the image-quality adjusting unit 4 obtains a calculation parameter from the calculation-process storing unit 5 on the basis of an image quality adjustment item receiving from the setting input unit 3, and searches the calculation-process storing unit 5 to obtain an output calculation amount on the basis of a set value for the calculation parameter that is selected at the setting input unit 3. The image-quality adjusting unit 4 then executes a calculation process on the input image data, using the obtained output calculation amount, to make a processed image as an output image, and puts out the processed image to the image output unit 8. The image-quality adjusting unit 4 may hold the checking image made at the check process stage, and put out the checking image to the image output unit 8 at the point that the image process has proceeded to the output process stage.

The checking-area extracting unit (area extracting unit) 6 obtains input image data from the input-image storing unit 2, and executes a process of comparing the input image of the input image data with a checking image generated by the image-quality adjusting unit 4 for each partial area of a predetermined size and extracting a partial area showing a greater variation as a checking area. The checking-area extracting unit 6 executes this process on a processed image processed according to each set value for each image quality adjustment item and on the input image for each image quality adjustment item. The checking-area extracting unit 6 puts out checking area specifying information for specifying the extracted checking area to the checking display unit 7.

The checking display (display) unit 7, for example, is made up of a crystal display, etc., and has a display screen 7a (see FIG. 3) on which the touch panel of the setting input unit 3 is arranged. The checking display unit 7 at least retrieves a portion of a processed image in a checking area as a checking image from checking area information from the checking-area extracting unit 6 and the processed image from the image-quality adjusting unit 4, and displays the checking image on the display screen 7a.

Figure 3:
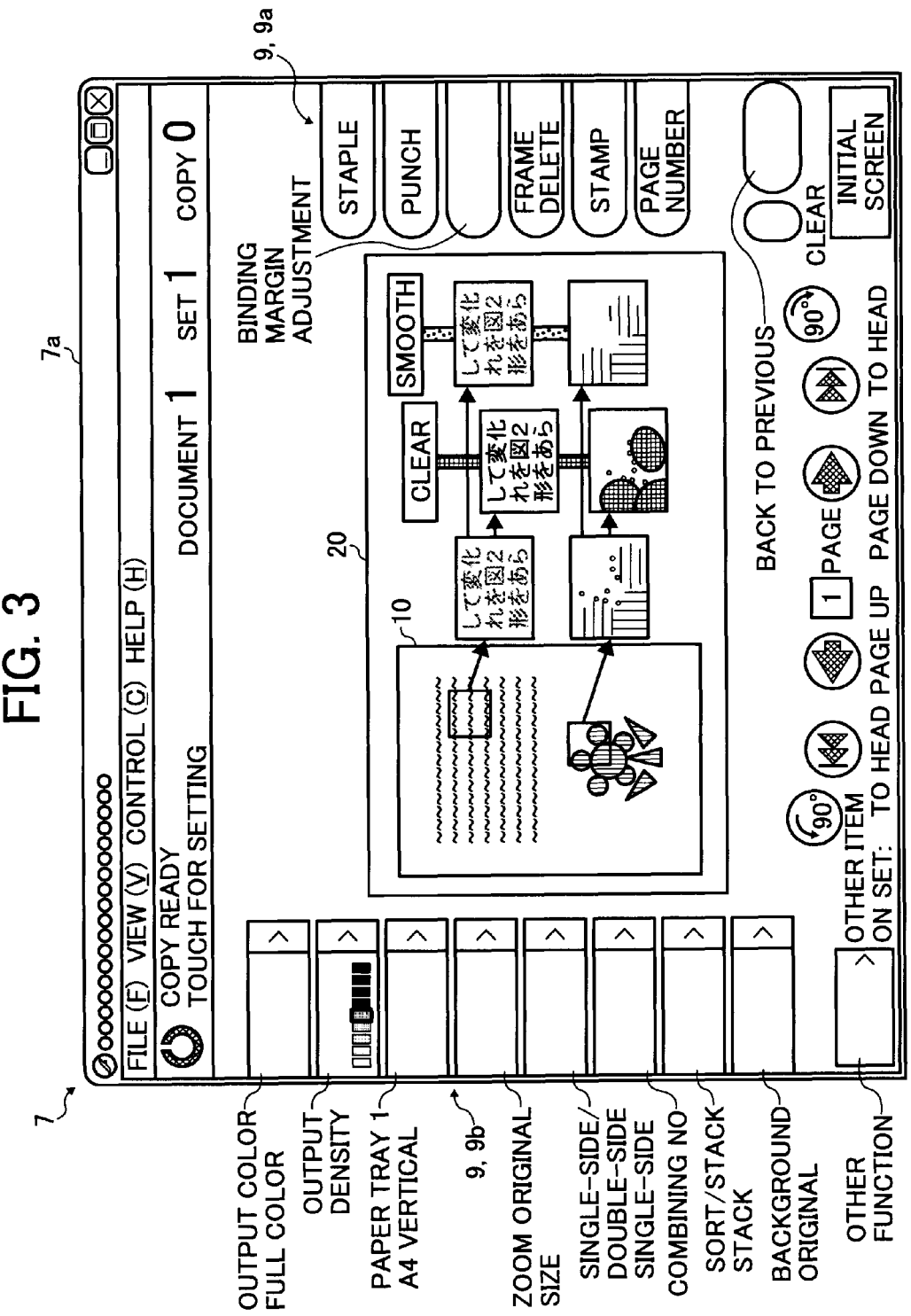
FIG. 3 is a front view of one example of display on a display screen of a checking display unit.

FIG. 3 is a front view of one example of display on the display screen 7a of the checking display unit 7. A checking image 20 including a target image (processed image) 10 and function setting items (menu items) 9 are displayed on the display screen 7a of the checking display unit 7. The function setting items (menu items) 9 include a menu 9a consisting of menu items of staple, punch, binding margin adjustment, frame delete, stamp, page number, etc., execution of which depends on a place on the target images (processed images) 10. The menu 9a is displayed at the right on the display screen 7a. The function setting items 9 also includes a menu 9b consisting of menu items of output color, output density, paper, zoom, single-side/double-side, combining, sort/stack, background, etc., execution of which does not depend on image contents. The menu 9b is displayed at the left on the screen 7a.

The image output unit (output unit) 8 includes a printing unit, such as a printer, which prints out an image on a paper by a predetermined printing method of, for example, electrophotograhic method, and a communication unit which transmits image data via a communication line. The image output unit 8 prints out an image according to predetermined characteristic values on the basis of output image data from the image-quality adjusting unit 4, and transmits image data via the communication line. The image output unit 8 may employ various printing methods other than the electrophotographic method, such as ink-jet method, sublimation-type heat transfer method, silver salt photographic method, direct thermographic method, and melt-type heat transfer method.

The image processing apparatus 1 of the present embodiment compares a processed image with an input image for each partial area, the processed image resulting by subjecting the input image (target image) to image quality adjustment (image process) according to setting contents, extracts a characteristic partial area (an area where a result of the image process executed on the target image is notable) as a checking area, and displays a portion of the processed image in the checking area as a checking image on the checking display unit 7.

Specifically, according to the image processing apparatus 1, the input-image storing unit 2 temporarily stores input image data input from the image input unit, such as the scanner unit or communication unit, and the contents of an image process executed on the input image data is set at the setting input unit 3 by giving a set value for each image quality adjusting item. Upon setting of the contents of image process on the input image data, the image-quality adjusting unit 4 determines the image quality adjusting item and set value according to the set contents, and obtains a check calculation amount corresponding to the determined image quality adjusting item and set value from the calculation-process storing unit 5. The image-quality adjusting unit 4 then executes a calculation process on the input image data in the input-image storing unit 2, using the check calculation amount, to generate a processed image having undergone image quality adjustment, and puts out the processed image to the checking-area extracting unit 6 and to the checking display unit 7.

The checking-area extracting unit 6 executes a process of comparing the processed image from the image-quality adjusting unit 4 with the input image in the input-image storing unit 2 for every partial area of a predetermined size (e.g. rectangular area having a predetermined area) and extracting a partial area showing a greater variation between the input image and the processed image as a checking area. The checking-area extracting unit 6 executes this process on the processed image processed according to each set value for each image quality adjustment item and on the input image, and puts out extracted checking area information for each set value to the checking display unit 7.

When receiving a processed image from the image-quality adjusting unit 4, therefore, the checking-area extracting unit 6 takes an input image corresponding to the processed image out of the input-image storing unit 2, and compares each variation between the input image and the processed image for every partial area as a checking area. This process is carried out as the following.

The horizontal coordinate on an image is represented by x coordinates indicating "0" at the left and a positive value at the right, and the vertical coordinate on the image is represented by y coordinates indicating "0" at the upper side and a positive value at the lower side. A point marked with values x and y for the x and y coordinates is represented as (x, y), and a rectangle having diagonal apexes determined by points (x1, y1) and (x2, y2) is represented as (x1, y1, x2, y2). A partial area, which is to be finally extracted as a checking area, is predetermined a width of w, and a length of h. This partial area is shifted from the left to right in an increment of ws, and from the upper side to the lower side in an increment of hs along an input image and a processed image, each of which is a check subject image, within a range that does not exceed the width W and the height H of the input image and the processed image. As the partial area is shifted, a difference D between a portion of the input image and a portion of the processed image in each partial area is determined. Then the maximum value Dm of difference Ds and the upper left point (Lm, Tm) of a partial area giving the maximum value Dm are stored in an internal memory.

Figure 4:
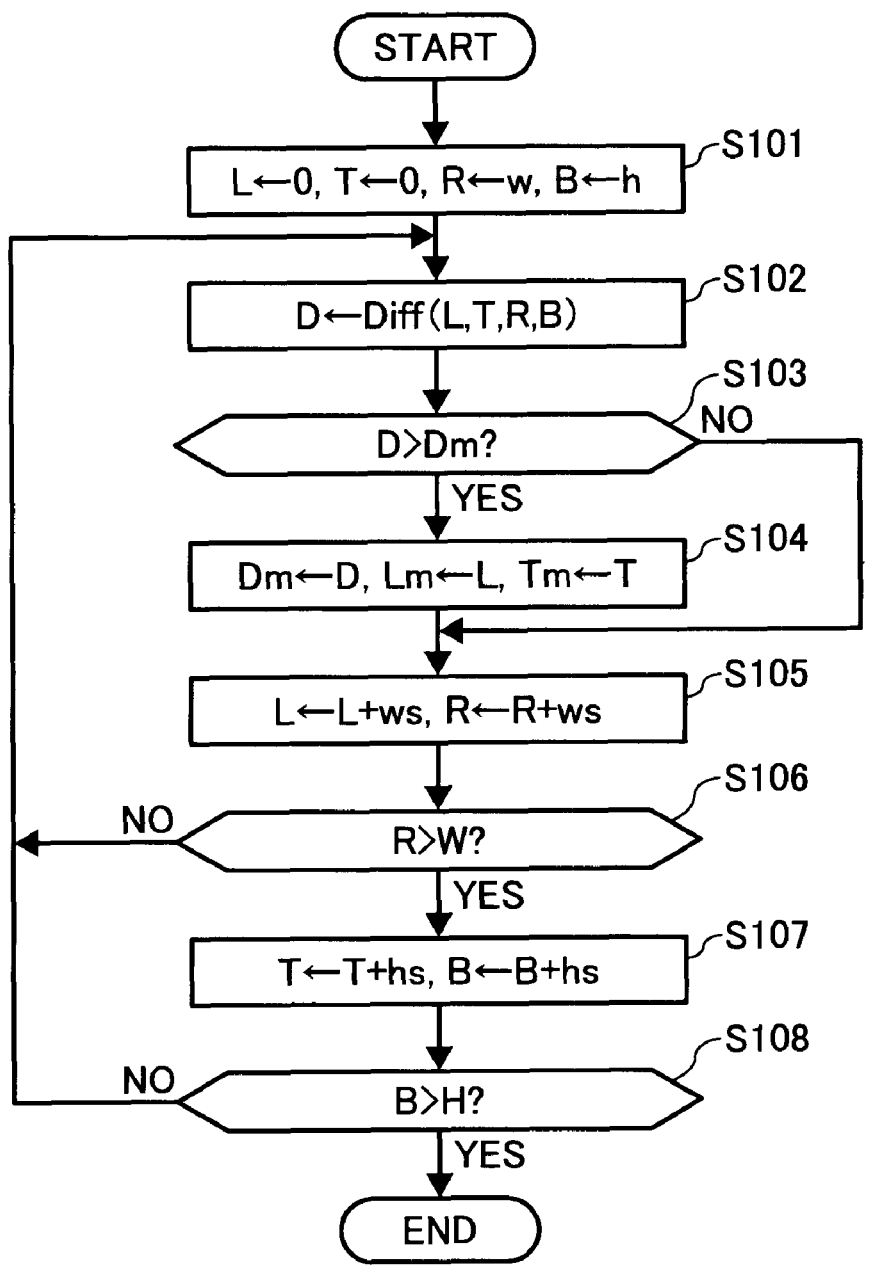
FIG. 4 is a flowchart of the flow of a checking area extracting process by a checking-area extracting unit.

FIG. 4 is a flowchart of the flow of a checking area extracting process by the checking-area extracting unit 6. At the start of the process flow, as shown in FIG. 4, the checking-area extracting unit 6 sets coordinate values (0, 0, w, h) for diagonal apexes (L, T, R, B) that determine a rectangle partial area (L←0, T←0, R←w, B←h) (step S101) The checking-area extracting unit 6 then executes a calculation process Diff to calculate a difference D between a portion of the input image and a portion of the processed image in the partial area, and defines a calculation result Diff as the difference D (step S102).

Subsequently, the checking-area extracting unit 6 compares the difference D resulting from the calculation at this time with the maximum value Dm stored in the internal memory to check on whether the difference D is larger than the maximum value Dm (step S103).

When the difference D resulting from the calculation at this time is larger than the maximum value Dm (Yes at step 103), the checking-area extracting unit 6 defines the difference D resulting from the calculation at this time as a new maximum value Dm, and defines the upper left point coordinates (L, T) of the partial area processed this time as the upper left point coordinates (Lm, Tm) of the partial area giving the new maximum value Dm (Lm←L, Tm←T) (step S104).

Then, a checking area is shifted to the next partial area right to the current partial area. To that end, the checking-area extracting unit 6 determines the L coordinate and R coordinate of the next partial area by adding the width increment ws in the x direction of the current partial area to the L coordinate and to the R coordinate of the current partial area (L←L+ws, R←R+ws) (step S105).

When the difference D resulting from the calculation at this time is the maximum value Dm or smaller (No at step 103), the checking-area extracting unit 6 proceeds to step S105, and carries out a process of shifting the checking area from the current partial area to the next partial area at the right thereto (step S105).

The checking-area extracting unit 6 then checks to see if the R coordinate of the shifted partial area has exceeded the width W of the check subject image (input image and processed image) (step S106). When the partial area has not shift to the edge of the width of the check subject image and check in each partial area in the right direction is not over (No at step S106), the checking-area extracting unit 6 returns to step S102, and executes the same process as described above on the next partial area to which the current partial area is shifted (steps S102 to S106).

When the partial area has shift to the edge of the width of the check subject image and check in each partial area in the right direction is completed (Yes at step S106), the checking-area extracting unit 6 shifts the checking area to the next partial area located at the head of the lower line next to the line where the current partial area belongs. To that end, the checking-area extracting unit 6 determines the T coordinate and B coordinate of the next partial area by adding the height increment hs in the y direction of the current partial area to the T coordinate and to the B coordinate of the current partial area (T←T+hs, B←B+hs) (step S107) The checking-area extracting unit 6 then checks to see if the coordinate B of the partial area shifted downward exceeds the height H of the check subject image (step S108).

When the B coordinate of the partial area shifted downward has not exceeded the height H of the check subject image (No at step S108), the checking-area extracting unit 6 returns to step S102, and calculates a difference D between a portion of the input image and a portion of the processed image in each partial area for the line where the partial area shifted downward belongs, checks on whether the difference D is larger than the current maximum value Dm, and detects a partial area giving the maximum value Dm (step S102 to S106). When R coordinate>the width W results to complete check on each partial area for one line at step S106, the checking-area extracting unit 6 executes the process of shifting the partial area to the next line (T←T+hs, B←B+hs) (step S107), and then checks to see if the coordinate B of the partial area shifted to the next line exceeds the height H of the check subject image (step S108).

Thus, the checking-area extracting unit 6 shifts the partial area as the checking area from the left to right in the increment Ws, and from the upper side to the lower side in the increment of the hs within the range that does not exceed the width W and height H of the check subject image. While shifting the partial area, the checking-area extracting unit 6 calculates a difference D between a portion of the input image and a portion of the output image in each partial area, and stores the maximum value Dm of difference Ds and the upper left point (Lm, Tm) of a partial area giving the maximum value Dm.

When the B coordinate of the partial area shifted downward has exceeded the height H of the check subject image (Yes at step S108), the checking area extracting process of detecting a partial area showing the most notable difference D between the input image and the output image (characteristic partial area) as a checking area is ended.

The checking-area extracting unit 6 executes the process of extracting a partial area giving the maximum value Dm as a checking area for each image quality adjustment item, thus extracts a checking area for every image quality adjustment item.

The checking-area extracting unit 6 puts out the coordinate values (Lm, Tm) of the upper left point of the extracted checking area for each image quality adjustment item to the checking display unit 7, the coordinate values being puts out as checking area information.

The checking display unit 7 extracts each portion of the processed image in each checking area as a checking image defined by each set value from the checking area information for each image quality adjustment item predetermined by the checking-area extracting unit 6 and from a processed image predetermined by the image-quality adjusting unit 4, the processed image portion in the checking area being extracted for each set value for each image quality adjustment item. The checking display unit 7 then displays the checking image 20 defined by each set value for each image quality adjustment item, for example, on the display screen 7a, as shown in FIG. 3.

Figure 5:
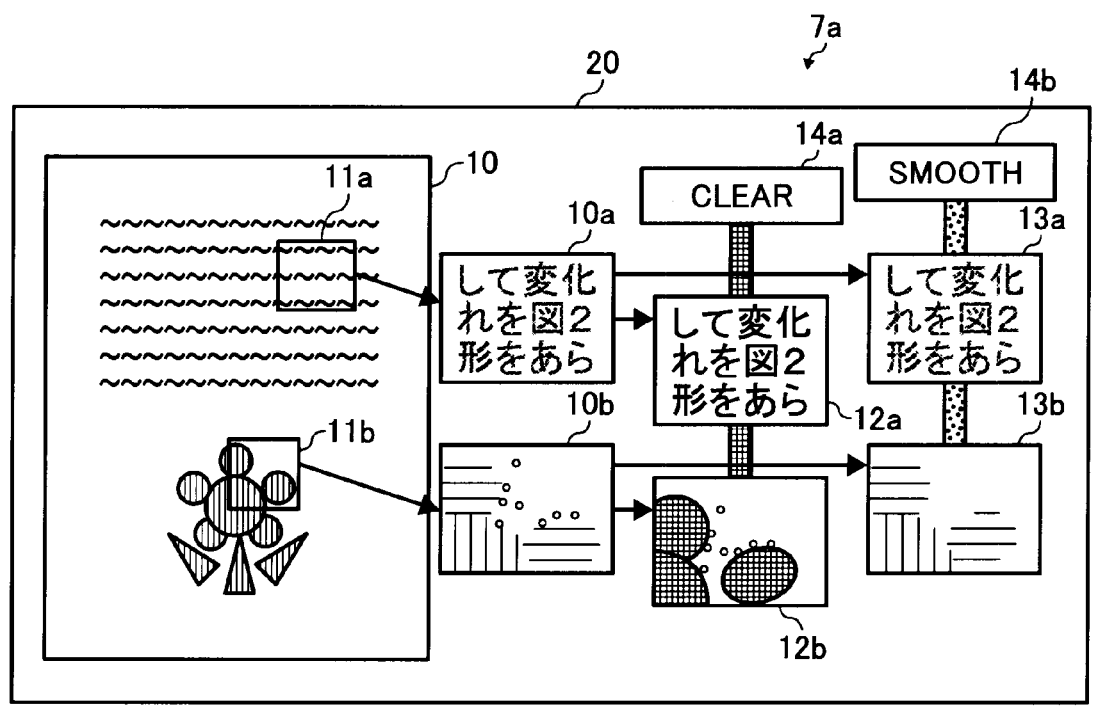
FIG. 5 is a model view of an enlarged checking image.

FIG. 5 is a model view of the enlarged checking image 20. In FIG. 5, the overall view of an input image 10 is displayed to occupy the left half of the display screen 7a, and the image quality adjustment item of sharpness is selected to present set values of "clear" and "smooth". A checking area 11a of a character portion and a checking area 11b of an image portion are extracted from the input image 10i and enlarged checking-area images 10a, 10b for the checking areas 11a, 11b are arranged at the right of the input image 10, where the checking area 11a is connected to the enlarged checking-area image 10a and the checking area 11b to the checking area image 10b via each arrow to indicate that the enlarged checking-area images 10a, 10b are enlarged images of the checking areas 11a, 11b. In addition, enlarged checking-area images 12a, 12b and 13a, 13b are each arranged at the right to the input image 10 as enlarged images of processed image portions in the checking areas 11a, 11b, which corresponds with the enlarged checking-area images 10a, 10b extracted from the input image 10 for the set values of "clear" and "smooth" for the image quality adjustment item of sharpness.

In FIG. 5, predetermined two checking areas 11a, 11b and two set values, the display screen 7a displays six enlarged checking-area images 10a, 10b, 12a, 12b, 13a, 13b in total. A user compares the enlarged checking-area images 10a, 10b, 12a, 12b, 13a, 13b, selects a set value that gives the user a result closest to a desired change, and touches either a button 14a for "clean" or a button 14b for "smooth" on the touch panel of the setting input unit 3. In response, the setting input unit 3 puts out the selected set value to the image-quality adjusting unit 4.

While the enlarged checking-area images 10a, 10b, 12a, 12b, 13a, 13b are listed all together in FIG. 5, this is not the only case. When a display space is short, a part of the enlarged checking-area images 10a, 10b, 12a, 12b, 13a, 13b may be displayed in turn by automatically switching display of the enlarged checking-area image in predetermined time intervals, or manually switching display of the same by user's operating a button.

According to the checking area extracting process executed by the checking-area extracting unit 6, as described above, checking areas are extracted according to the number of image quality adjustment items. This, however, is not the only case. When the number of the image quality adjustment items is great and checking areas corresponding in number to the image quality adjustment items cannot be displayed on the display screen 7a of the checking display unit 7, a representative checking area selecting process may be executed to select a representative checking area, and the selected representative checking area is displayed first on the display screen 7a of the checking display unit 7. A method of selecting a representative checking area includes such a method of representing a plurality of checking areas close to each other in coordinate position by one checking area.

According to the image processing apparatus 1 of the present embodiment, the checking-area extracting unit 6 extracts a checking area, which is a partial area of a predetermined size showing a characteristic image process result (partial area where the effect of an image-process executed on a target image is notable) of a processed image that is predetermined by subjecting an input image, which is the target image, to the image process (image quality adjustment) at the image-quality adjusting unit 4 according to process-setting contents. A portion of the processed image corresponding to the extracted checking area is then displayed as a checking image on the display screen 7a of the checking display unit 7.

A user is, therefore, allowed to properly and clearly check a process result from an input image based on setting contents by checking a checking image showing the process result characteristically. Based on the checked process result, the user then makes setting on the setting input unit 3 to be able to carry out a more proper image process.

According to the image processing apparatus 1 of the present embodiment, the checking-area extracting unit 6 compares each variation between an input image and a processed image in each partial area, where a portion of the input image and a portion of the processed image correspond to each other, and extracts a partial area showing a greater variation as a checking area.

Thus, an image in the partial area showing a greater variation between the input image and the processed image is presented as the checking image showing a process result characteristically. A user is, therefore, allowed to properly and clearly check a process result by checking such a checking image, and makes setting on the setting input unit 3 based on the checked process result to be able to carry out a more proper image process.

According to the image processing apparatus 1 of the present embodiment, a plurality of set values (process set values) are set for a plurality of image quality adjusting items (process items) as process-setting contents. Accordingly, the checking-area extracting unit 6 extracts a checking area for every image quality adjusting item executed on an input image.

A user is, therefore, allowed to properly and clearly check a process result by checking a checking image showing the process result characteristically for every image quality adjusting item executed on the input image. This enables the user to make setting on the setting input unit 3 based on the checked process result to be able to carry out a more proper image process.

According to the image processing apparatus 1 of the present embodiment, a checking image is displayed in comparison with an input image on the display screen 7a of the checking display unit 7.

This allows a user to check a process result further clearly by observing the checking image in comparison with the input image, thus enabling the user to make setting on the setting input unit 3 based on the checked process result to be able to carry out a more proper image process.

According to the image processing apparatus 1 of the present embodiment, a plurality of set values are set for a plurality of image quality adjusting items as process-setting contents. The image-quality adjusting unit 4 then generates processed images according to the set values, and the checking display unit 7 displays portions of processed images corresponding to checking areas from the processed images according to the set values. The checking display unit 7 displays the processed image portions corresponding to the checking areas as checking images each defined by each set value for each image quality adjustment item in a state where the checking images can be compared with each other.

This allows a user to check a process result by comparing each of the processed image portions resulting from a process according to a plurality of set values for each image quality adjusting item, thus enabling the user to make setting on the setting input unit 3 based on the checked process result to be able to carry out a more proper image process.

Figure 6:
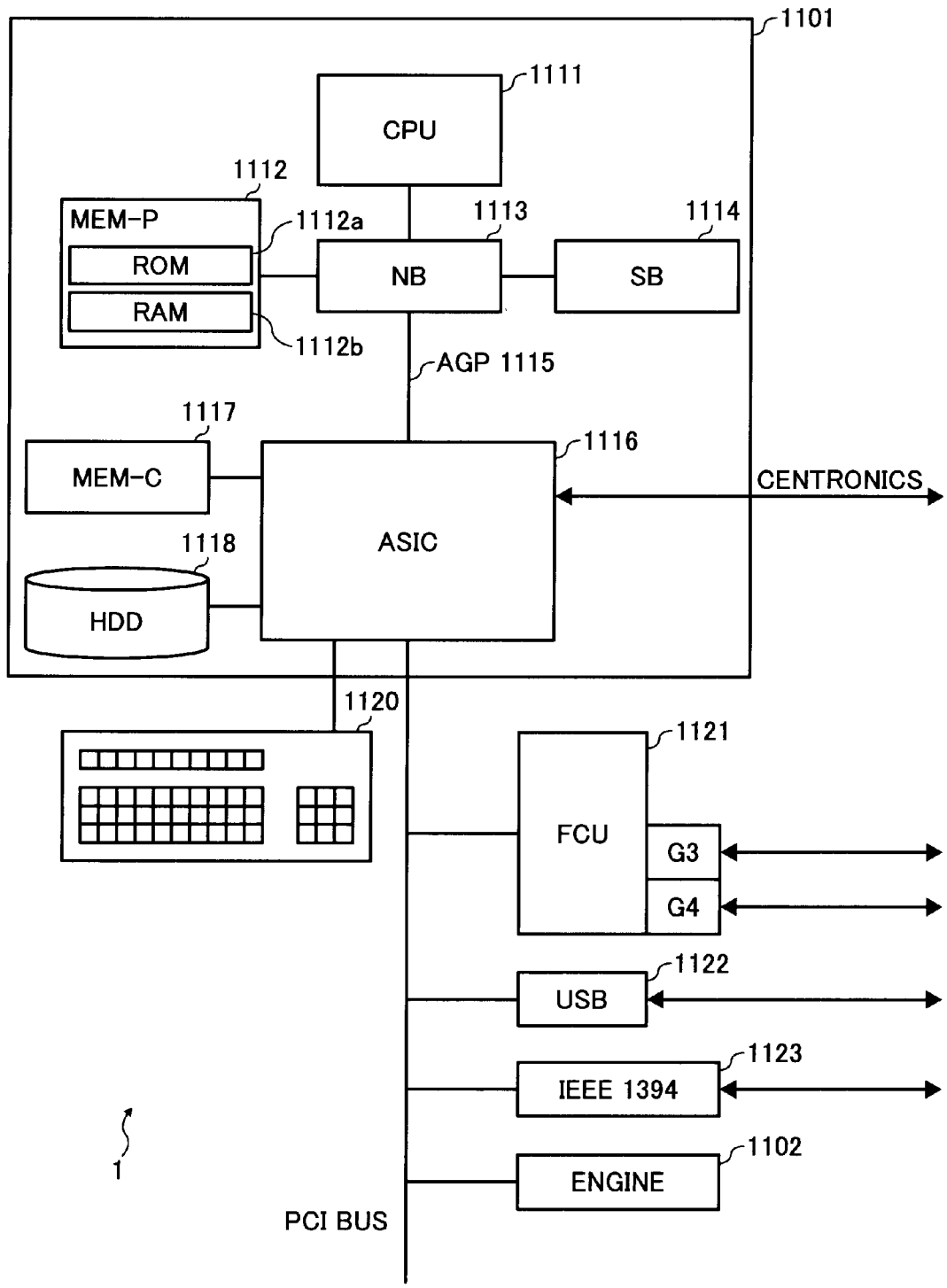
FIG. 6 is a block diagram of the hardware configuration of the image processing apparatus.

FIG. 6 is a block diagram of the hardware configuration of the image processing apparatus 1 according to the present embodiment. The image processing apparatus 1 is constructed as an MFP having multiple functions of faxing, scanning, etc. As shown in FIG. 6, the image processing apparatus 1 includes a controller 1101, and an engine unit 1102, which are interconnected via a peripheral component interconnect (PCI) bus. The controller 1101 controls the overall operation of the image processing apparatus 1, and also controls graphic performance, communication, and input from an operating unit 1120. The engine unit 1102 is such a printer engine connectible to the PCI bus as black/white plotter, 1-drum color plotter, 4-drum color plotter, scanner, or fax unit. In addition to an engine portion, such as plotter, the engine unit 1102 also includes an image processing portion serving for error diffusion or gamma conversion.

The controller 1101 has a CPU 1111, a system memory (MEM-P) 1112, a north bridge (NB) 1113, a south bridge (SB) 1114, an application-specific integrated circuit (ASIC) 1116, a local memory (MEM-C) 1117, and a hard disk drive (HDD) 1118. The NB 1113 is connected to the ASIC 1116 via an accelerated graphics port (AGP) bus 1115. The MEM-P 1112 has a ROM 1112a, and a RAM 1112b.

The CPU 1111 executes general control over the image processing apparatus 1, and has a chip set composed of the NB 1113, the MEM-P 1112, and the SB 1114. The CPU 1111 is connected to other units via the chip set.

The NB 1113 is a bridge that connects the CPU 1111 to the MEM-P 1112, to the SB 1114, and to the AGP bus 1115. The NB 1113 has a memory controller controlling reading/writing on the MEM-P 1112, a PCI master, and an AGP target.

The MEM-P 1112 is a system memory used for storing programs and data, for developing programs and data, for graphic operation by a printer, etc. The MEM-P 1112 consists of the ROM 1112a, and the RAM 1112b. The ROM 1112a is a read-only memory used for storing programs and data that controls the operation of the CPU 1111. The RAM 1112b is a readable/writable memory used for developing programs and data, for graphic operation by a printer, etc.

The SB 1114 is a bridge that connects the NB 1113 to PCI devices and peripheral devices. The SB 1114 is connected to the NB 1113 via the PCI bus, to which a network interface (I/F) unit is connected.

The ASIC 1116 is an integrated circuit (IC) for use in image processing, and has a hardware element for image processing. The ASIC 1116 plays a role as a bridge that interconnects the AGP bus 1115, the PCI bus, the HDD 1118, and the MEM-C 1117. The ASIC 1116 includes a PCI target, an AGP master, an arbiter (ARB) constituting the kernel of the ASIC 1116, a memory controller that controls the MEM-C 1117, a plurality of direct memory access controllers (DMACs) that rotate image data using a hardware logic, and a PCI unit that executes data transfer between the PCI unit and the engine unit 1102 via the PCI bus. The ASIC 1116 is connected to a fax control unit (FCU) 1121, to a universal serial bus (USB) 1122, and to an IEEE 1394 (the Institute of Electrical and Electronics Engineers 1394) I/F 1123 via the PCI bus.

The MEM-C 1117 is a local memory used as an image buffer for copying and as a code buffer. The HDD 1118 is a storage that accumulates image data, programs controlling the operation of the CPU 1111, font data, and forms.

The AGP bus 1115 is a bus I/F for a graphic accelerator card that is proposed to speed up graphic processes. The AGP bus 1115 provides direct access to the MEM-P 1112 at high throughput to allow high-speed performance of the graphic accelerator card.

The operating unit 1120 connected to the ASIC 1116 receives operational input from an operator, and sends information of the received operational input to the ASIC 1116.

An image displaying program and an image forming program executed by the image processing apparatus 1 of the present embodiment are preinstalled in the ROM, etc., and are provided for execution.

The image displaying program and image forming program executed by the image processing apparatus 1 of the present embodiment may be recorded on a computer-readable recording medium, such as a CR-ROM, a flexible disk (FD), a CD-R, or a digital versatile disk (DVD), as a file in an installable format or an executable format, and be provided for execution.

The image displaying program and image forming program executed by the image processing apparatus 1 of the present embodiment may be stored in a computer connected to a network, such the Internet, and be downloaded via the network for execution. The image displaying program and image forming program executed by the image processing apparatus 1 of the present invention may be provided or distributed via a network, such as the Internet.

The image processing apparatus 1 of the present embodiment is of a module structure that includes each unit described above (input-image storing unit 2, setting input unit 3, image-quality adjusting unit 4, calculation-process storing unit 5, checking-area extracting unit 6, checking display unit 7, and image output unit 8). As the CPU (processor) reads the image displaying program and image forming program out of the ROM and executes the programs, each unit is loaded into the main memory to generate the input-image storing unit 2, the setting input unit 3, the image-quality adjusting unit 4, the calculation-process storing unit 5, the checking-area extracting unit 6, the checking display unit 7, and the image output unit 8 in the main memory.

Figures 7, 8:
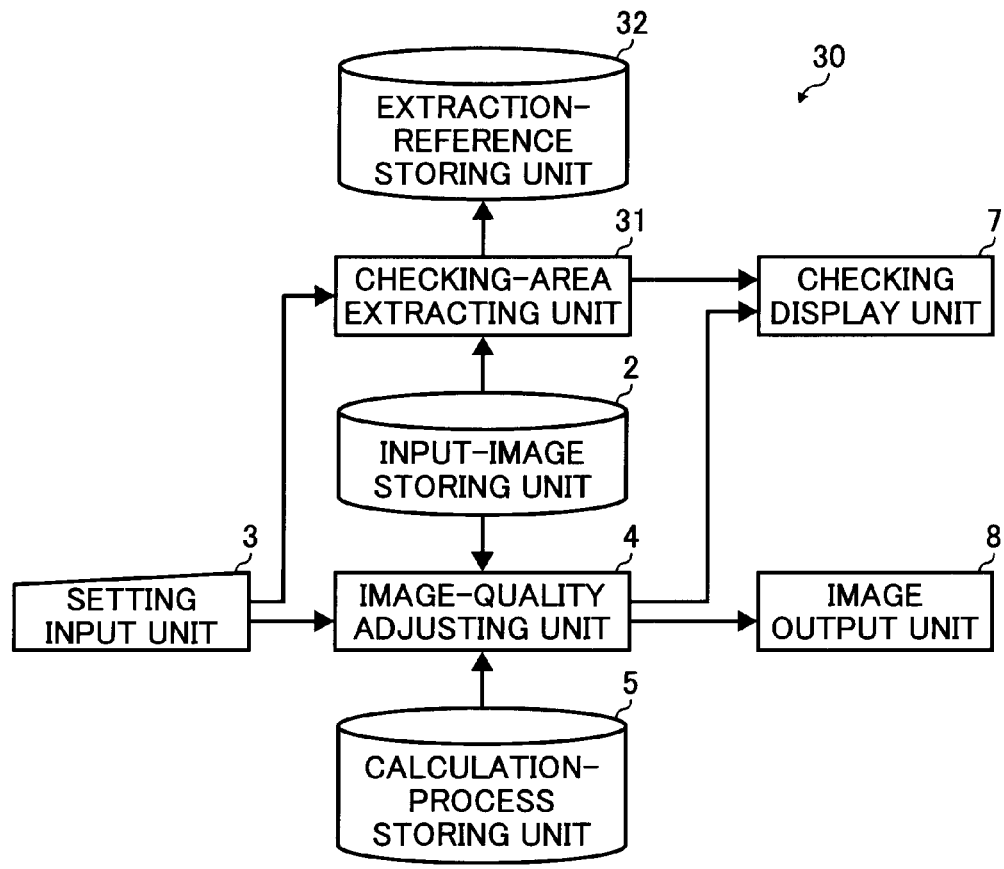
FIG. 7 is a block diagram of the main units of an image processing apparatus according to a second embodiment of the present invention.
FIG. 8 is a model view of one example of an extraction reference table.

FIG. 7 is a block diagram of the main units of an image processing apparatus provided as a second embodiment of the user interface unit and the image processing apparatus according to the present invention.

The present embodiment relates to an image processing apparatus same as the image processing apparatus 1 of the first embodiment. The description of the present embodiment will be made by using the same reference numerals used for the description of the first embodiment.

As shown in FIG. 7, an image processing apparatus 30 according to the present embodiment has the same components as the image processing apparatus 1 of the first embodiment, which includes the input-image storing unit 2, the setting input unit 3, the image-quality adjusting unit 4, the calculation-process storing unit 5, the checking-area extracting unit 6, the checking display unit 7, the image output unit 8, and the image input unit not shown. The image processing apparatus 30 further includes a checking-area extracting unit 31 and an extraction-reference storing unit 32.

According to the image processing apparatus 30, the setting input unit 3 detects an image quality adjustment item selected by a user, and delivers the selected item to the image-quality adjusting unit 4 and to the checking-area extracting unit 31. After display of a checking area on the checking display unit 7 is over, the setting input unit 3 receives a set value selected from a plurality of set values prepared for each selected image adjustment item, and delivers the selected set value to the image-quality adjusting unit 4 and to the checking-area extracting unit 31.

The extraction-reference storing unit 32 stores an extraction reference table that relates image quality adjustment items in correspondence to checking area extraction references. In the extraction reference table, for example, a plurality of extraction references are set for each of a plurality of image quality adjusting items, such as "sharpness" and "color adjustment (yellow)", as shown in FIG. 8. For example, for an image quality adjusting item of "sharpness" "high-frequency element" is set as an extraction reference 1 and "low-frequency element" is set as an extraction reference 2.

The checking-area extracting unit (area extracting unit) 31 searches the extraction reference table of the extraction-reference storing unit 32 for an extraction reference corresponding to a set image quality adjusting item for each image quality adjusting item set at the setting input unit 3. The checking-area extracting unit 31 calculates a feature amount in terms of the searched out extraction reference for each partial area of an input image data. Then, the checking-area extracting unit (area extracting unit) 31 executes a process of extracting a partial area showing a feature amount calculation result greater than that of other partial areas as a checking area that shows image adjustment result characteristically. The checking-area extracting unit 31 executes this process for each image quality adjusting item, and puts out checking area information for specifying the extracted checking area to the checking display unit 7.

The effect obtained by the present embodiment is described. According to the image processing apparatus 30 of the present invention, the feature amount of each partial area of an input image (target image) is calculated for each image quality adjusting item on the basis of an extraction reference preset for each image quality adjusting item, and a partial area showing the largest feature amount is extracted as a checking area. A portion of a processed image in the checking area is displayed as a checking image on the checking display unit 7.

Specifically, according to the image processing apparatus 30, the input-image storing unit 2 temporarily stores input image data input from the image input unit, such as the scanner unit or communication unit, and the contents of an image process on the input image data is set at the setting input unit 3 by giving a set value for each image quality adjusting item. Upon setting of the contents of image process on the input image data, the image-quality adjusting unit 4 determines the image quality adjusting item and set value according to the set contents, and obtains a check calculation amount corresponding to the determined image quality adjusting item and set value from the calculation-process storing unit 5. The image-quality adjusting unit 4 then executes a calculation process on the input image data in the input-image storing unit 2, using the check calculation amount, to generate a processed image having undergone image quality adjustment, and puts out the processed image to the checking-area extracting unit 6 and to the checking display unit 7.

Meanwhile, the checking-area extracting unit 31 searches the extraction reference table of the extraction-reference storing unit 32 for an extraction reference corresponding to a set image quality adjusting item for each image quality adjusting item set at the setting input unit 3. The checking-area extracting unit 31 calculates a feature amount in terms of the searched out extraction reference for each partial area of an input image data. Then, the checking-area extracting unit 31 executes a process of extracting a partial area showing a feature amount calculation result greater than that of other partial areas as a checking area that shows image adjustment result characteristically. The checking-area extracting unit 31 executes this process for each image quality adjusting item, and puts out checking area information for specifying the extracted checking area to the checking display unit 7.

The checking-area extracting unit 31 thus searches the extraction reference table of the extraction-reference storing unit 32 for an extraction reference for an image quality adjusting item set at the setting input unit 3, and then calculates the feature amount of an input image for each partial area, which is a checking area. This process is carried out as the following.

In the same manner as the first embodiment, the horizontal coordinate on an image is represented by x coordinates indicating "0" at the left and a positive value at the right, and the vertical coordinate on the image is represented by y coordinates indicating "0" at the upper side and a positive value at the lower side. A point marked with values x and y for the x and y coordinates is represented as (x, y), and a rectangle having diagonal apexes determined by points (x1, y1) and (x2, y2) is represented as (x1, y1, x2, y2). A partial area, which is to be finally extracted as a checking area, is predetermined a width of w, and a length of h. This partial area is shifted from the left to right in an increment of ws, and from the upper side to the lower side in an increment of hs along an input image, which is a check subject image, within a range that does not exceed the width W and the height H of the input image. As the partial area is shifted, the feature amount C of an input image portion in each shifted partial area is determined. Then the maximum value Cm of characteristic quantities Cs and the upper left point (Lm, Tm) of a partial area giving the maximum value Cm are stored in an internal memory.

Figure 9:
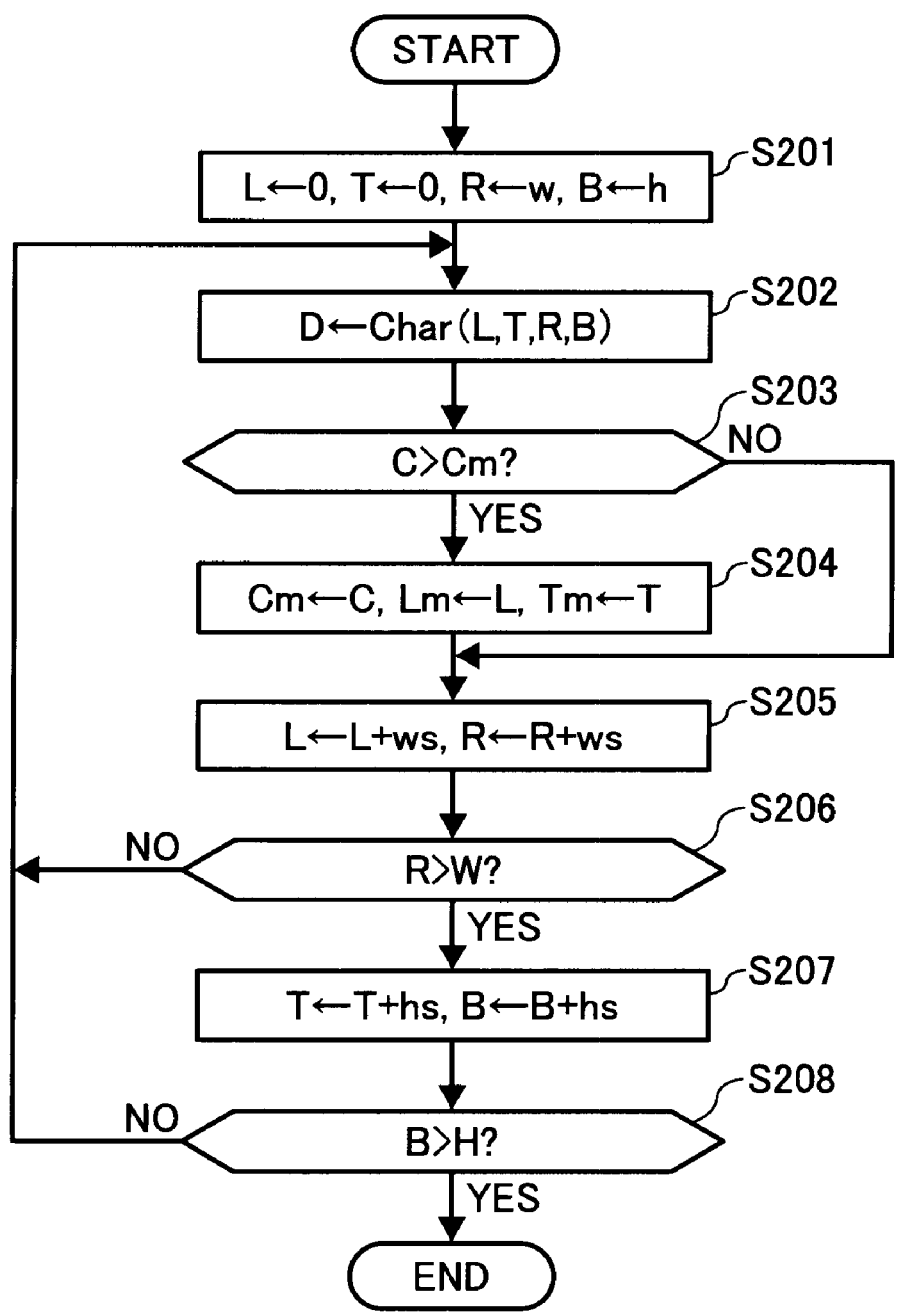
FIG. 9 is a flowchart of the flow of a checking area extracting process by a checking-area extracting unit.

FIG. 9 is a flowchart of the flow of a checking area extracting process by the checking-area extracting unit 31. At the start of the process flow, as shown in FIG. 9, the checking-area extracting unit 31 sets coordinate values (0, 0, w, h) for diagonal apexes (L, T, R, B) that determine a rectangle partial area (L←0, T←0, R←w, B←h) (step S201) The checking-area extracting unit 6 then executes a calculation process Char to calculate the extraction-reference-based feature amount of an input image for the partial area, and defines a extraction-reference-based feature amount calculation result Char (x1, y1, x2, y2) as a feature amount C (step S202).

In the reference-based feature amount calculation process Char (x1, y1, x2, y2) (hereinafter "calculation process Char"), for example, when the image quality adjusting item "sharpness" is predetermined, an extraction reference of "high-frequency" is extracted from the extraction reference table shown in FIG. 8, which is stored in the extraction-reference storing unit 32, and "high-frequency" is taken to be a feature amount to be calculated. Thus, the checking-area extracting unit 31 executes the calculation process Char of integrating output from a high-pass filter.

The checking-area extracting unit 31 compares a feature amount C resulting from the calculation at this time with a maximum value Cm stored in the internal memory to check on whether the feature amount C is larger than the maximum value Cm (step S203).

When the feature amount C resulting from the calculation at this time is larger than the maximum value Cm (Yes at step 203), the checking-area extracting unit 31 defines the feature amount C resulting from the calculation at this time as a new maximum value Cm, and defines the upper left point coordinates (L, T) of the partial area processed this time as the upper left point coordinates (Lm, Tm) of the partial area giving the new maximum value Cm (Lm←L, Tm←T) (step S204) Then, a checking area is shifted to the next partial area right to the current partial area. To that end, the checking-area extracting unit 31 determines the L coordinate and R coordinate of the next partial area by adding the width increment ws in the x direction of the current partial area to the L coordinate and to the R coordinate of the current partial area (L←L+ws, R←R+ws) (step S205).

When the feature amount C resulting from the calculation at this time is the maximum value Cm or smaller (No at step 203), the checking-area extracting unit 31 proceeds to step S205, and carries out a process of shifting the checking area from the current partial area to the next partial area at the right thereto (step S205).

The checking-area extracting unit 31 then checks to see if the R coordinate of the shifted partial area has exceeded the width W of the input image as the check subject image (step S206). When the partial area has not shift to the edge of the width of the check subject image and check in each partial area in the right direction is not over (No at step S206), the checking-area extracting unit 31 returns to step S202, and executes the same process as described above on the next partial area to which the current partial area is shifted (steps S202 to S206).

When the partial area has shift to the edge of the width of the check subject image and check in each partial area in the right direction is completed (Yes at step S206), the checking-area extracting unit 31 shifts the checking area to the next partial area located at the head of the lower line next to the line where the current partial area belongs. To that end, the checking-area extracting unit 31 determines the T coordinate and B coordinate of the next partial area by adding the height increment hs in the y direction of the current partial area to the T coordinate and to the B coordinate of the current partial area (T←T+hs, B←B+hs) (step S207). The checking-area extracting unit 31 then checks to see if the coordinate B of the partial area shifted downward exceeds the height H of the check subject input image (step S208).

When the B coordinate of the partial area shifted downward has not exceeded the height H of the check subject input image (No at step S208), the checking-area extracting unit 31 returns to step S202, and calculates the feature amount C of an input image portion in each partial area for the line where the partial area shifted downward belongs, checks on whether the feature amount C is larger than the current maximum value Cm, and detects a partial area giving the maximum value Cm (step S202 to S206). When the R coordinate>the width W results to complete check on each partial area for one line at step S206, the checking-area extracting unit 31 executes the process of shifting the partial area to the next line (T←T+hs, B←B+hs) (step S207), and then checks to see if the coordinate B of the partial area shifted to the next line exceeds the height H of the check subject input image (step S208).

Thus, the checking-area extracting unit 31 shifts the partial area, which is the checking area, from the left to right in the increment Ws, and from the upper side to the lower side in the increment of the hs within the range that does not exceed the width W and height H of the check subject image. While shifting the partial area, the checking-area extracting unit 31 calculates the feature amount C of an input image portion in each partial area, and stores the maximum value Cm of feature amount Cs and the upper left point (Lm, Tm) of a partial area giving the maximum value Cm.

When the B coordinate of the partial area shifted downward has exceeded the height H of the check subject input image (Yes at step S208), the checking-area extracting unit 31 ends the checking area extracting process of detecting a partial area showing the most notable feature amount C of the input image (characteristic partial area) as a checking area.

The checking-area extracting unit 31 executes the process of extracting a partial area giving the maximum value Cm as a checking area for every image quality adjustment item, thus extracts a checking area for every image quality adjustment item.

The checking-area extracting unit 31 puts out the coordinate values (Lm, Tm) of the upper left point of the extracted checking area for every image quality adjustment item to the checking display unit 7, the coordinate values being puts out as checking area information.

The checking display unit 7 extracts a portion of a processed image in each checking area as a checking image defined by each set value from the checking area information for each image quality adjustment item predetermined by the checking-area extracting unit 31 and from a processed image predetermined by the image-quality adjusting unit 4, the processed image portion in the checking area being extracted for each set value for each image quality adjustment item. The checking display unit 7 then displays the checking image defined by each set value for each image quality adjustment item, for example, on the display screen 7a, as shown in FIG. 3.

As described above, according to the image processing apparatus 30, a plurality of set values are set for a plurality of image quality adjusting items as process-setting contents, and the image quality adjusting items are related in correspondence to extraction references for a checking area, and the related image quality adjusting items and extraction references are stored in the form of the extraction reference table in the extraction-reference storing unit 32. The checking-area extracting unit 31 retrieves an extraction reference corresponding to an image quality adjusting item executed on an input image from the extraction-reference storing unit 32, calculates a feature amount in terms of the extracted extraction reference for each partial area of the input image, and extracts a partial area showing a larger feature amount as a calculation result.

Thus, a partial area showing an image process result characteristically (partial area where the effect of an image process executed on a target image is notable) can be extracted easily and quickly as a checking area. This improves process speed, and allows a user to properly and clearly check a process result by checking the checking image showing the process result characteristically. Based on the checked process result, the user makes setting on the setting input unit 3 to be able to carry out a more proper image process.

According to the first and second embodiments, the image processing apparatus of the present invention (image processing apparatus 1) is provided in the form of an MFP, but the form of the image processing apparatus in a practical application is not limited to such a compound machine. Various effects equal to the effects described above can be obtained by, for example, connecting an image forming device, such as printer, to a personal computer (PC), and installing a predetermined program in a memory unit, such as a hard disk drive (HDD), of the PC, then causing the CPU of the PC to operate according to the installed program.

Figure 10:
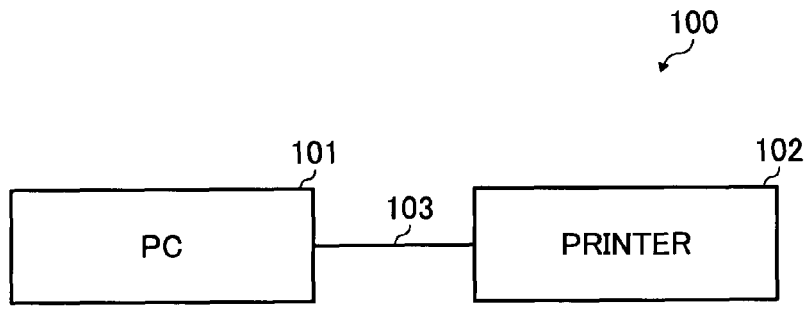
FIG. 10 is a block diagram of a schematic structural example of a print system according to a third embodiment of the present invention.

FIG. 10 is a block diagram of a schematic structural example of a print system 100 according to the third embodiment of the present invention. The print system 100 shown in FIG. 10 includes a PC 101 that sends out a print job including print data and print conditions for printing out the print data, a printer 102 that prints the print data, and a cable 103 that connects the PC 101 to the printer 102.

The PC 101 sends print data corresponding to a prepared document and print condition data set for printing of the document (paper direction, double-side, combining, bookbinding, stapling, punching, zoom, etc.), both data being sent as a print job, to the printer 102.

The printer 102 prints out the print data according to the print job sent from the PC 101. Specifically, the printer 102 prints out the print data included in the print job on a medium, such as paper, according to the print condition data included in the print job (paper direction, double-side, combining, bookbinding, stapling, punching, zoom, etc.).

The specific constitution of the PC 101 and of the printer 102 will now be described in order.

Figure 11:
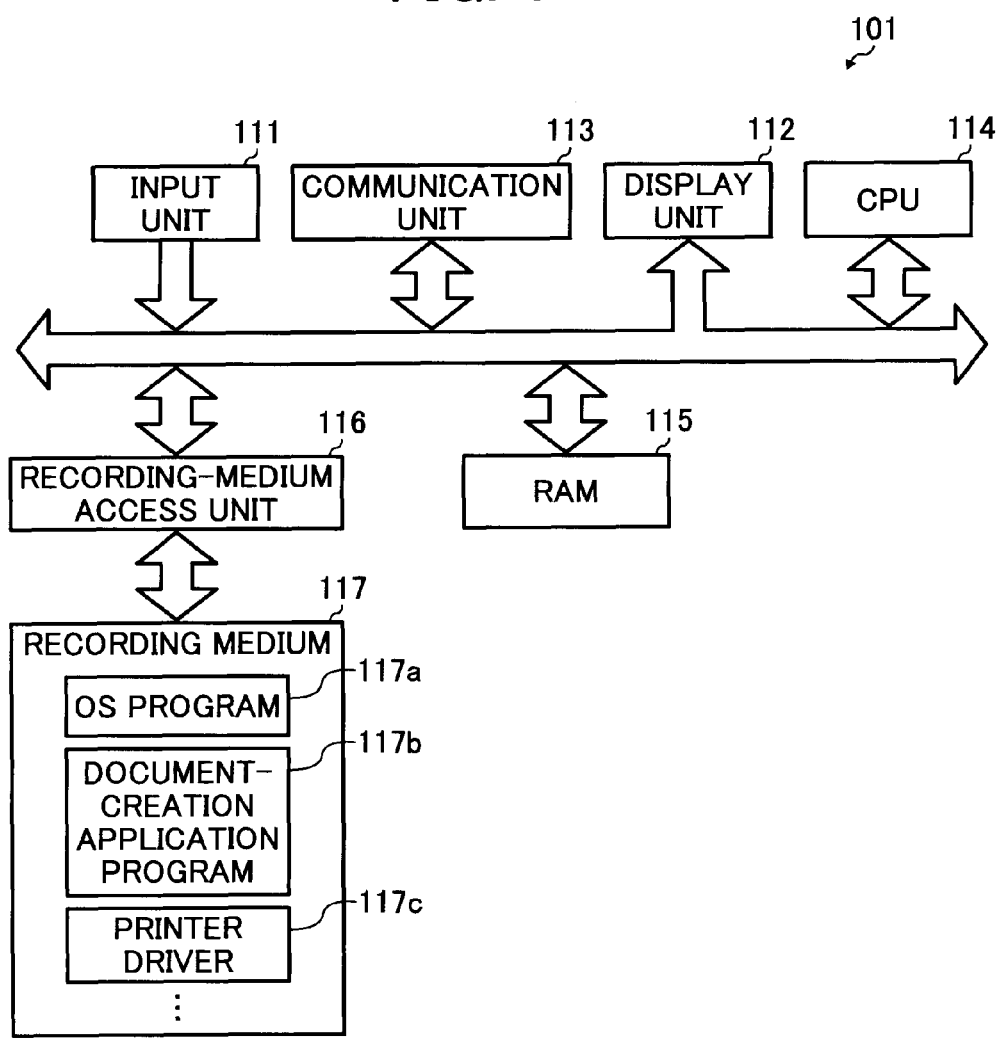
FIG. 11 is a block diagram of the schematic structure of a PC.

FIG. 11 is a block diagram of the schematic structure of the PC 101. As shown in FIG. 11, the PC 101 includes an input unit 111 for data input, a communication unit 113 for data communication, a CPU 114 that executes control over the entire part of the PC 101, a RAM 115 that is used as a work area for the CPU 114, a recording-medium access unit 116 that writes and reads data in and out of a recording medium 117, and the recording medium 117 that stores various programs for operating the CPU 114.

The input unit 111 includes a keyboard having a cursor key, numerical input keys, various functional keys, etc., and a mouse or slice pad for selecting a key on the display screen of a display unit 112. The input unit 111 is a user interface for a user to give the CPU 114 an operational command or input data.

The display unit 112 consists of a CRT or LCD, and makes display according to display data input from the CPU 114. The communication unit 113 handles data communication with external equipment, and executes data communication, for example, with the printer 102, etc. via the cable 103.

The CPU 114 is a central control unit that controls the entire part of the PC 101 according to programs stored in the recording medium 117. The CPU 114 is connected to the input unit 111, to the display unit 112, to the communication unit 113, to the RAM 115, and to the recording-medium access unit 116. The CPU 114 controls data communication, readout of an application program through access to a memory or reading/writing of various data, data/command input, display, etc. The CPU 114 sends print data and print condition data for the print data, which are input from the input unit 111, to the printer 102 as a print job via the communication unit 113.

The RAM 115 has a work memory that stores a specified program, an input instruction, input data, a process result, etc, and a display memory that temporarily stores display data to be put out on the display screen of the display unit 112.

The recording medium 117 stores various programs and data including an OS program 117a(e.g. WINDOWS (registered trademark), etc.) that can be executed by the CPU 114, a document-creation application program 117b, and a printer driver 117c operable on the printer 102. The recording medium 117 includes, for example, optical, magnetic, or electric recording medium, such as a flexible disk, a hard disk, a CD-ROM, a DVD-ROM, a magneto-optical (MO) disk, and a PC card. The various programs are put in a data format readable to the CPU 114, and are stored in the recording medium 117. The programs are recorded beforehand on the recording medium in some cases, or are downloaded via a communication line and are stored in the recording medium in other cases. The programs can be distributed via the communication line.

Figure 12:
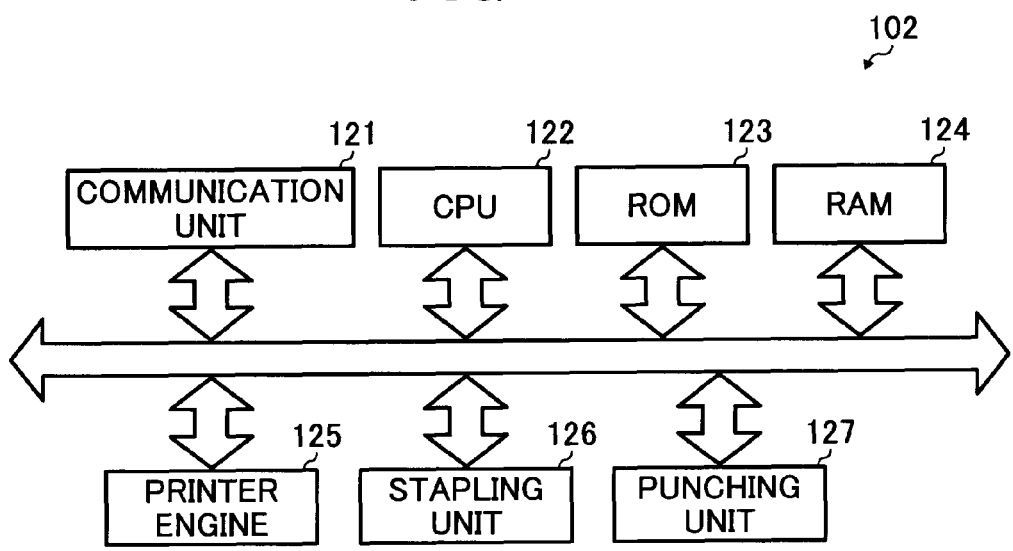
FIG. 12 is a block diagram of the schematic structure of a printer.

FIG. 12 is a block diagram of the schematic structure of the printer 102. As shown in FIG. 12, the printer 102 includes a communication unit 121 that executes data communication, a CPU 122 that executes control over the whole of the printer 102, a ROM 123 that stores various control programs for running the CPU 122, a RAM 124 that temporarily stores print data and print condition data included in a print job, which is input from a work area for the various control programs, from the PC 101, etc., a printer engine 125 that prints the print data on a transfer paper, a stapling unit 126 that staples papers bearing printed print data, and a punching unit 127 that punches a hole on the transfer paper bearing the printed print data. The printer 102 has a double-side function, a punching function, a stapling function, etc.

The communication unit 121 handles data communication with external equipment, and, for example, communicates with the PC 101 through data exchange.

The CPU 122 is a central control unit that controls the entire part of the printer 102 according to the various control programs stored in the ROM 123. The CPU 122 is connected to the communication unit 121, to the ROM 123, to the RAM 124, to the printer engine 125, to the stapling unit 126, and to the punching unit 127. The CPU 122 controls data communication, printer operation, etc.

The ROM 123 stores the various control programs for running the CPU 122, parameters used for processes by the control programs, etc. The RAM 124 has a work memory that stores a specified control program, a process result, received print data, etc.

The printer engine 125 is a printer engine run by an electrophotographic method, which is a unit that prints print data on a transfer paper. The printer 102 may be run by various printing methods other than the electrophotographic method, such as ink-jet method, sublimation-type heat transfer method, silver salt photographic method, direct thermographic method, and melt-type heat transfer method.

The printer driver 117c of the PC 101 will then be described. The printer driver 117c is a software program that is so designed that a program can be run relative to a specific program on the printer 102 without being troubled with the hardware and/or internal language of the printer 102. The printer driver 117c controls the printer 102, and executes output data processing, etc.

Pursuant to the printer driver 117c, the CPU 114 of the PC 101 executes such operations as generation and display of an expected finished image on the basis of print data and print condition data for the print data, both data being input from the input unit 111, and transfer of print data made by the document-creation application program 117b to the printer 102.

Figure 13:
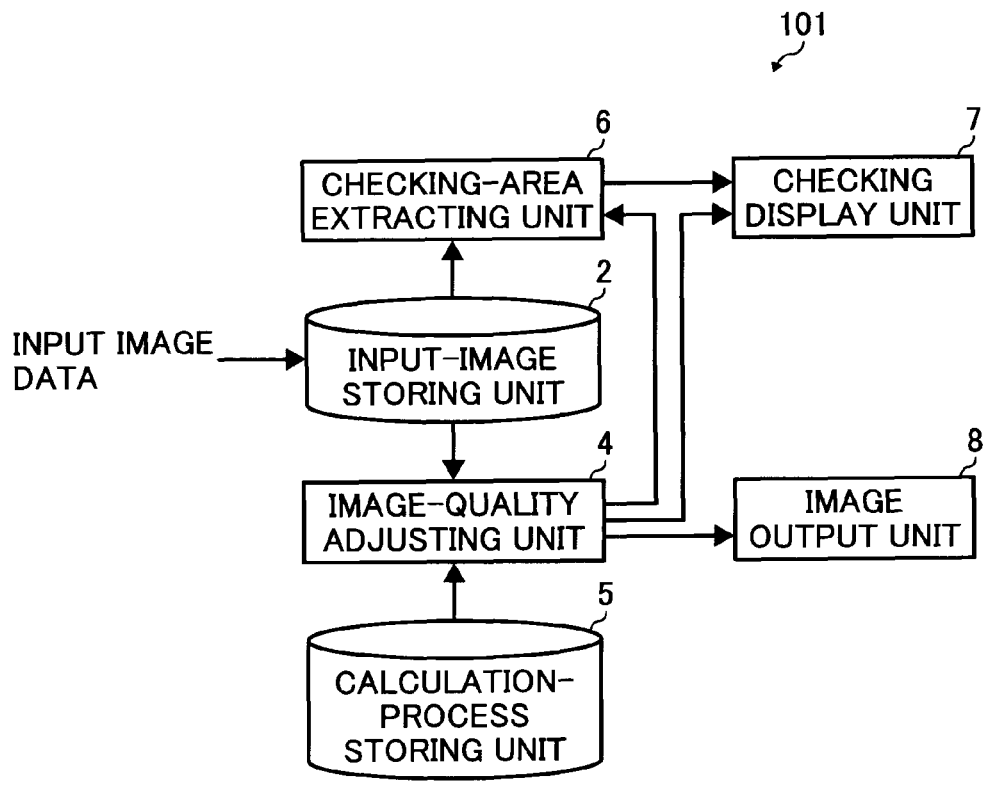
FIG. 13 is a block diagram of an example of the main components of the PC.

As the CPU 114 operates in pursuant to the printer driver 117c, the PC 101 comes to have the same components as the image processing apparatus 1 has, which includes the input-image storing unit 2, the image-quality adjusting unit 4, the calculation-process storing unit 5, the checking-area extracting unit 6, the checking display unit 7, and the image output unit 8, as shown in FIG. 13. The PC 101 causes the input unit 111 to serve as the setting input unit 3.

Figure 14:
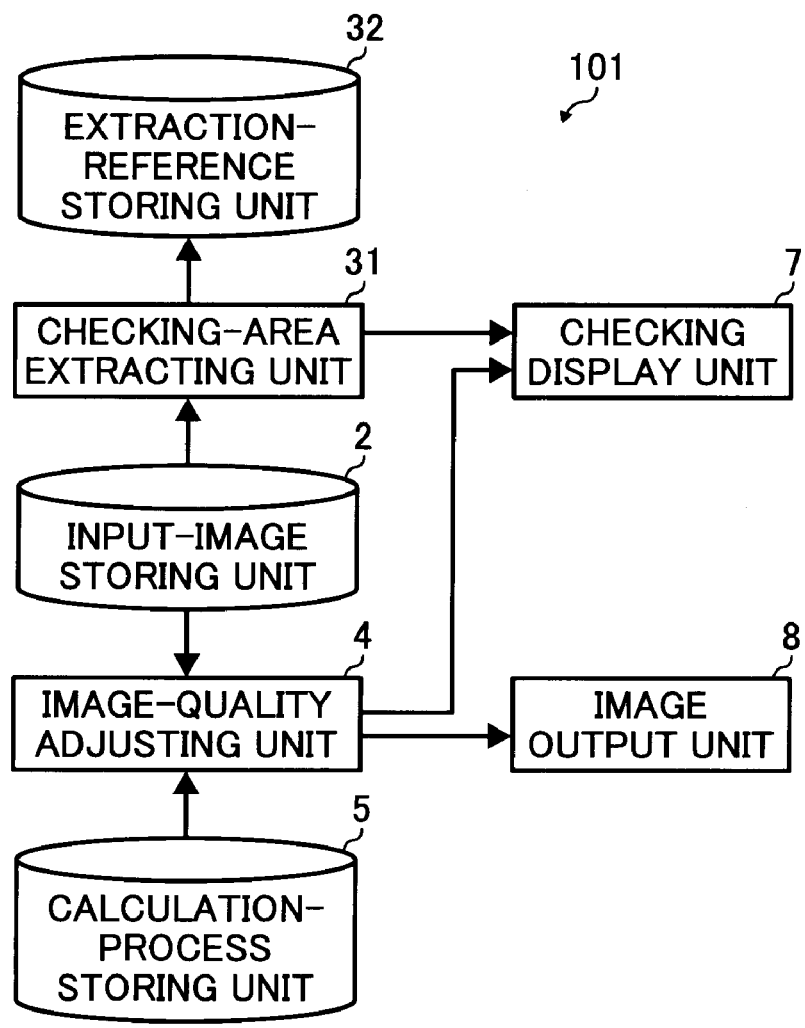
FIG. 14 is a block diagram of another example of the main components of the PC.

As the CPU 114 operates in pursuant to the printer driver 117c in another embodiment, the PC 101 also comes to have the same components as the image processing apparatus 1 has, which includes the input-image storing unit 2, the image-quality adjusting unit 4, the calculation-process storing unit 5, the checking-area extracting unit 31, the extraction-reference storing unit 32, the checking display unit 7, and the image output unit 8, as show in FIG. 14. The PC 101 causes the input unit 111 to serve as the setting input unit 3.

The PC 101, therefore, comes to have the same system configuration as that of the image processing apparatus 1 shown in FIG. 1 to offer the same various effects as explained in the first and the second embodiments when the CPU 114 operates in pursuant to the printer driver 117c.

Figure 15:
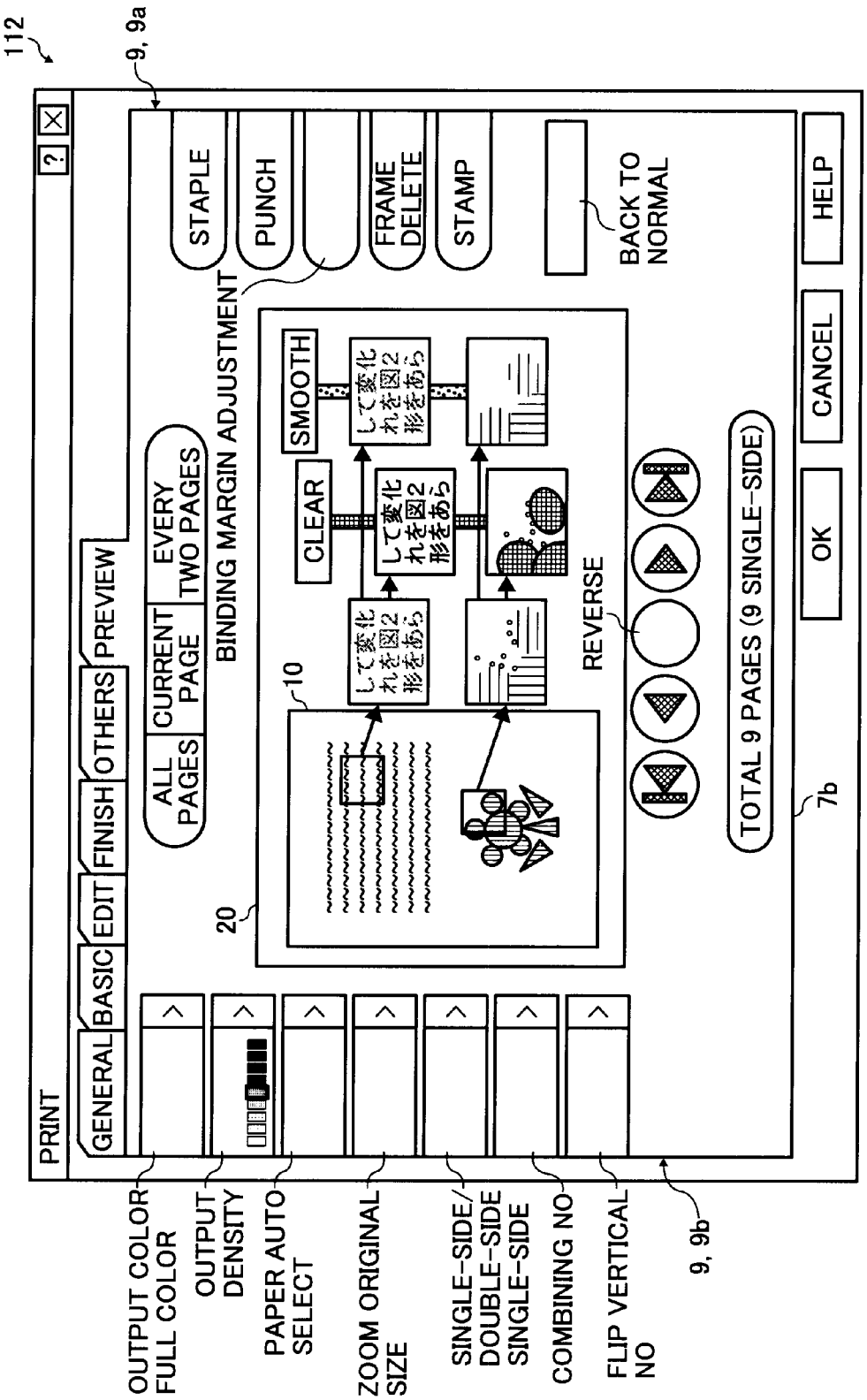
FIG. 15 is a front view of one example of a display screen produced by a printer driver.

FIG. 15 is a front view of one example of a display screen produced by the printer driver 117c. The screen shown in FIG. 15 is a screen that is displayed when the start of the printer driver 117c is selected on a display screen of the document-creation application program 117b, the start screen of the OS program 117a, etc. The screen shown in FIG. 15 allows a selection of a preview setting screen 7b (equivalent to the display screen 7a of the checking display unit 7 of the image processing apparatus 1 (image processing apparatus 30)) for generating/displaying an expected finished image based on print data and print condition data for the print data, both data being sent from the input unit 111, in addition to a selection of a basic condition setting screen, an editing condition setting screen, a finishing condition setting screen, etc.

According to the present embodiment, operation of the CPU 114 of the PC 101 in pursuant to the printer driver 117c results in display of the preview setting screen 7b for generating/displaying an expected finished image based on print data and print condition data for the print data, both data being sent from the input unit 111. The way of displaying the preview setting screen 7b, however, is not limited to the above case. The preview setting screen 7b may be displayed by operating the CPU 114 of the PC 101 in pursuant to the document-creation application program 117b or the OS program 117a.

While the present invention provided by the inventor has been described in detail with reference to the preferred embodiments, the above description is not intended to limit the present invention. Various modifications of the embodiments will be possible as far as the modifications fall within the true scope of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image processing unit that executes an image process on a target image based on process-setting contents, and generates a processed image;
an area extracting unit that compares the processed image with the target image, and extracts a partial area of a predetermined size showing a notable effect of the image process executed on the target image, as a checking area; and
a checking-image display unit that displays the processed image corresponding to the extracted checking area on a display unit, as a checking image for checking the process-setting contents of the image process, wherein:
a plurality of process set values are set for each of various process items related to the process-setting contents, and
the area extracting unit extracts the checking area for each of the process items executed on the target image.

2. An image processing apparatus comprising:
an image processing unit that executes an image process on a target image based on process-setting contents, and generates a processed image;
an area extracting unit that compares the processed image with the target image, and extracts a partial area of a predetermined size showing a notable effect of the image process executed on the target image, as a checking area;
a checking-image display unit that displays the processed image corresponding to the extracted checking area on a display unit, as a checking image for checking the process-setting contents of the image process; and
an extraction-reference storing unit that stores various process items related to the process-setting contents and extraction references for the checking area in a corresponding manner, wherein
the area extracting unit retrieves an extraction reference for the checking area corresponding to a process item executed on the target image from the extraction-reference storing unit, calculates a feature amount of the extraction reference retrieved for each of the partial areas of the target image, and extracts a partial area having a feature amount greater than that of other partial areas, as the checking area.

3. An image processing apparatus comprising:
an image processing unit that executes an image process on a target image based on process-setting contents, and generates a processed image;
an area extracting unit that compares the processed image with the target image, and extracts a partial area of a predetermined size showing a notable effect of the image process executed on the target image, as a checking area; and
a checking-image display unit that displays the processed image corresponding to the extracted checking area on a display unit, as a checking image for checking the process-setting contents of the image process, wherein:
the checking-image display unit displays the processed image corresponding to the extracted checking area, from among processed images generated based on a plurality of process set values for each of various process items related to the process-setting contents, in a state of being comparable as the checking images for checking each of the process values for each of the process items.

4. An image processing apparatus comprising:
an image processing unit that executes an image process on a target image based on process-setting contents, and generates a processed image;
an area extracting unit that compares the processed image with the target image, and extracts a partial area of a predetermined size showing a notable effect of the image process executed on the target image, as a checking area;
a checking-image display unit that displays the processed image corresponding to the extracted checking area on a display unit, as a checking image for checking the process-setting contents of the image process; and
an output unit that outputs the processed image as an output image, wherein
the image processing unit generates the checking image and the processed image by executing an image process based on characteristics of the display unit and the output unit.

5. An image processing apparatus comprising:
an image processing unit that executes an image process on a target image based on process-setting contents, and generates a processed image;
an area extracting unit that compares the processed image with the target image, and extracts a partial area of a predetermined size showing a notable effect of the image process executed on the target image, as a checking area and a checking-image display unit that displays the processed image corresponding to the extracted checking area on a display unit, as a checking image for checking the process-setting contents of the image process, wherein:

the area extracting unit extracts a plurality of checking areas, and the checking-image display unit displays a plurality of checking images corresponding to the checking areas on the display unit simultaneously or sequentially.

* * * * *